(12) United States Patent
Mudawar et al.

(10) Patent No.: US 8,778,063 B2
(45) Date of Patent: Jul. 15, 2014

(54) COILED AND MICROCHANNEL HEAT EXCHANGERS FOR METAL HYDRIDE STORAGE SYSTEMS

(75) Inventors: Issam Mudawar, West Lafayette, IN (US); Milan Visaria, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 231 days.

(21) Appl. No.: 13/147,094

(22) PCT Filed: Feb. 4, 2010

(86) PCT No.: PCT/US2010/023192
§ 371 (c)(1),
(2), (4) Date: Jul. 29, 2011

(87) PCT Pub. No.: WO2010/091178
PCT Pub. Date: Aug. 12, 2010

(65) Prior Publication Data
US 2011/0284184 A1    Nov. 24, 2011

Related U.S. Application Data

(60) Provisional application No. 61/149,920, filed on Feb. 4, 2009, provisional application No. 61/184,608, filed on Jun. 5, 2009, provisional application No. 61/149,931, filed on Feb. 4, 2009, provisional application No. 61/184,595, filed on Jun. 5, 2009.

(51) Int. Cl.
*B01D 53/04*   (2006.01)
*F17C 11/00*   (2006.01)

(52) U.S. Cl.
USPC ............ 96/146; 206/7; 165/104.19; 165/157; 165/163

(58) Field of Classification Search
USPC ......... 206/0.7; 423/658.2; 502/526; 429/515; 96/146; 420/900; 165/104.19, 104.11, 165/157, 159, 163
See application file for complete search history.

(56) References Cited

U.S. PATENT DOCUMENTS

| 3,955,782 A | 5/1976 | Calder et al. |
| 3,978,660 A | 9/1976 | Laing |
| 4,043,546 A | 8/1977 | Ashfield et al. |

(Continued)

FOREIGN PATENT DOCUMENTS

| EP | 0305702 | 3/1989 |
| EP | 0324266 | 7/1989 |

(Continued)

OTHER PUBLICATIONS

PCT Application No. PCT/US2010/023192, International Preliminary Report on Patentability. Aug. 18, 2011.

(Continued)

*Primary Examiner* — Frank Lawrence, Jr.
(74) *Attorney, Agent, or Firm* — John V. Daniluck; Douglas G. Gallagher; Bingham Greenebaum Doll LLP

(57) ABSTRACT

Various apparatus and methods for exchanging heat from a solid to a liquid. Some embodiments pertain to removing heat from a pressure vessel in which a gas absorption reaction is occurring. Yet other embodiments pertain to pressure vessels in which hydrogen is being absorbed into a metal hydride.

30 Claims, 15 Drawing Sheets

(56) References Cited

U.S. PATENT DOCUMENTS

| | | | |
|---|---|---|---|
| 4,120,150 A | 10/1978 | Wakeman | |
| 4,165,569 A * | 8/1979 | Mackay | 34/416 |
| 4,253,516 A | 3/1981 | Giardina | |
| 4,254,618 A | 3/1981 | Elovic | |
| 4,311,232 A * | 1/1982 | Klatt et al. | 206/0.7 |
| 4,457,136 A * | 7/1984 | Nishizaki et al. | 62/46.2 |
| 4,537,249 A | 8/1985 | Harris | |
| 4,548,186 A | 10/1985 | Yamaji et al. | |
| 4,609,038 A * | 9/1986 | Ishikawa et al. | 165/104.12 |
| 4,665,974 A | 5/1987 | Grehier et al. | |
| 4,756,163 A * | 7/1988 | Garg | 62/46.3 |
| 4,773,212 A | 9/1988 | Griffin et al. | |
| 4,819,717 A | 4/1989 | Ishikawa et al. | |
| 4,856,581 A | 8/1989 | Santoro | |
| 4,880,319 A | 11/1989 | Haggerty | |
| 5,046,247 A | 9/1991 | Oguro | |
| 5,082,048 A * | 1/1992 | Iwaki et al. | 165/104.12 |
| 5,123,242 A | 6/1992 | Miller | |
| 5,149,018 A | 9/1992 | Clark | |
| 5,165,466 A | 11/1992 | Arbabian | |
| 5,269,133 A | 12/1993 | Wallace | |
| 5,297,386 A | 3/1994 | Kervistin | |
| 5,317,877 A | 6/1994 | Stuart | |
| 5,337,553 A | 8/1994 | Barr | |
| 5,678,408 A | 10/1997 | Janes | |
| 5,778,972 A | 7/1998 | Sapru et al. | |
| 5,787,976 A * | 8/1998 | Hamburgen et al. | 165/185 |
| 5,794,448 A | 8/1998 | Fujioka et al. | |
| 5,819,525 A | 10/1998 | Gaul et al. | |
| 5,961,697 A * | 10/1999 | McManus et al. | 96/126 |
| 6,015,041 A | 1/2000 | Heung | |
| 6,170,530 B1 | 1/2001 | Steblina | |
| 6,295,803 B1 | 10/2001 | Bancalari | |
| 6,432,379 B1 * | 8/2002 | Heung | 423/648.1 |
| 6,478,077 B1 | 11/2002 | Story et al. | |
| 6,584,778 B1 | 7/2003 | Griffiths et al. | |
| 6,626,323 B2 | 9/2003 | Stetson et al. | |
| 6,638,348 B2 | 10/2003 | Kuriiwa et al. | |
| 6,672,072 B1 | 1/2004 | Giffin, III | |
| 6,709,497 B2 | 3/2004 | Myasnikov et al. | |
| 6,857,270 B2 | 2/2005 | Kobayashi et al. | |
| 6,878,353 B2 | 4/2005 | Ovshinsky et al. | |
| 6,939,392 B2 | 9/2005 | Huang et al. | |
| 6,993,913 B2 | 2/2006 | Kobayashi et al. | |
| 7,000,404 B2 | 2/2006 | Palmisano et al. | |
| 7,112,239 B2 | 9/2006 | Kimbara et al. | |
| 7,115,159 B2 * | 10/2006 | Fujita et al. | 96/108 |
| 7,143,581 B2 | 12/2006 | Kobayashi et al. | |
| 7,185,483 B2 | 3/2007 | Czachor | |
| 7,231,769 B2 | 6/2007 | Spadaccini et al. | |
| 7,241,331 B2 * | 7/2007 | Wu et al. | 96/134 |
| 7,269,955 B2 | 9/2007 | Albers et al. | |
| 7,320,726 B2 | 1/2008 | Shih et al. | |
| 7,323,043 B2 | 1/2008 | Finamore | |
| 7,326,281 B2 | 2/2008 | Fujita et al. | |
| 7,431,756 B2 | 10/2008 | Myasnikov et al. | |
| 7,448,441 B2 | 11/2008 | Hendricks et al. | |
| 7,455,723 B2 | 11/2008 | Voss et al. | |
| 7,478,525 B2 | 1/2009 | Iya et al. | |
| 7,487,642 B2 | 2/2009 | Joshi et al. | |
| 7,607,307 B2 | 10/2009 | Bergholz | |
| 7,640,751 B2 | 1/2010 | Putnam | |
| 2002/0006365 A1 * | 1/2002 | Suzuki et al. | 422/177 |
| 2002/0073618 A1 * | 6/2002 | Ovshinsky et al. | 48/61 |
| 2003/0209147 A1 | 11/2003 | Myasnikov et al. | |
| 2003/0209149 A1 | 11/2003 | Myasnikov et al. | |
| 2006/0053801 A1 | 3/2006 | Orlando et al. | |
| 2006/0060328 A1 | 3/2006 | Ewes et al. | |
| 2006/0108098 A1 | 5/2006 | Stevanovic et al. | |
| 2007/0000562 A1 * | 1/2007 | Handa | 141/82 |
| 2007/0220731 A1 | 9/2007 | Soroka et al. | |
| 2008/0168776 A1 | 7/2008 | Arnold et al. | |
| 2008/0185123 A1 | 8/2008 | Nelson et al. | |
| 2008/0229755 A1 | 9/2008 | Koganezawa et al. | |
| 2008/0302246 A1 | 12/2008 | Carruthers et al. | |
| 2009/0107853 A1 | 4/2009 | Tan et al. | |
| 2009/0133400 A1 | 5/2009 | Callas | |

FOREIGN PATENT DOCUMENTS

| | | |
|---|---|---|
| EP | 0325452 | 7/1989 |
| EP | 0651145 | 5/1995 |
| EP | 0924409 | 6/1999 |
| EP | 0961095 | 12/1999 |
| EP | 1154135 | 4/2006 |
| FR | 2563899 | 11/1985 |
| GB | 2080933 | 2/1982 |
| GB | 2365114 | 2/2002 |
| JP | 57-196086 | 1/1982 |
| JP | 2001295995 A | 10/2001 |
| JP | 2006207719 A | 8/2006 |
| KR | 2005-0077734 | 8/2005 |
| WO | 9518947 | 7/1995 |
| WO | 0216743 | 2/2002 |
| WO | 2005117559 | 12/2005 |
| WO | 2008087526 | 7/2008 |

OTHER PUBLICATIONS

PCT Application No. PCT/US2010/023192, International Search Report and Written Opinion. Apr. 2, 2010.

Aceves, S.M., et al., "Vehicular storage of hydrogen in insulated pressure vessels," International Journal of Hydrogen Energy, 31 (2006) 2274-2283.

Mori, D., et al., "Recent challenges of hydrogen storage technologies for fuel cell vehicles," International Journal of Hydrogen Energy, 34 (2009) 4569-4575.

Mellouli, F., et al., "Numerical study of heat exchanger effects on charge/discharge times of metal-hydrogen storage vessel," International Journal of Hydrogen Energy, 34 (2009) 3005-3017.

Botzung, S., et al., "Simulation and experimental validation of a hydrogen storage tank with metal hydrides," International Journal of Hydrogen Energy, 33 (2008) 98-104.

Laurencelle, F., et al., "Simulation of heat transfer in a metal hydride reactor with aluminum foam," International Journal of Hydrogen Energy, 32 (2007) 2957-2964.

Kapischke, J., et al., "Measurement of the effective thermal-conductivity of a metal hydride bed with chemical-reaction," Exp. Therm. Fluid Sci., 9 (3) (1994) 337-344.

Hydrogen, fuel cells and infrastructure technologies program, multi-year research, developent and demonstration plan: planned program activities for 2005-2015, Energy Efficiency and Renewal Energy, U.S. Department of Energy, Washington, DC, 2007.

Guo, Z., "Enhancement of heat and mass transfer in metal hydride beds with the addition of Al plates," Heat and Mass Transfer 34 (1999) pp. 517-523. Jul. 17, 1998.

Rosso, M.J. et al., "Heat Transfer Enhancement in Metal Hydride Systems," Alternative Energy Sources II, pp. 3539-3545. Dec. 31, 1979.

Suda, S. et al., "Effective Thermal Conductivity of Metal Hydride Beds," Journal of the Less-Common Metals, 89 (1983) pp. 317-324. Dec. 31, 1983.

Chen, Yun et al., "Metal hydride beds and hydrogen supply tanks as minitype PEMFC hydrogen sources," International Journal of Hydrogen Energy 28 (2003) pp. 329-333. Dec. 31, 2003.

Nagel, M. et al., "Effective Thermal Conductivity of a Metal Hydride Bed Augmented with a Copper Wire Matrix," Journal of the Less-Common Metals, 120 (1986) pp. 35-43. Dec. 31, 1986.

Mason, John L., "Heat Transfer in Crossflow," Proceedings of the second US National Congress of Applied Mechanics, University of Michigan, Ann Arbor, Michigan, Jun. 14-18, 1954, pp. 801-803.

Copeland, D., et al., Manifold Microchannel Heat Sinks: Isothermal Analysis, InterSociety Conference on Thermal Phenomena, 1996, pp. 251-257.

Bruening, G., et al., "Cooled Cooling Air Systems for Turbine Thermal Management," presented at the International Gas Turbine & Aeroengine Congress & Exhibition, Indianapolis, IN, Jun. 7-10, 1999, pp. 1-7.

(56) References Cited

OTHER PUBLICATIONS

Bowers, M., et al., "Two-Phase Electronic Cooling Using Mini-Channel and Micro-Channel Heat Sinks: Part 1—Design Criteria and Heat Diffusion Constraints," Journal of Electronic Packaging, vol. 116, Dec. 1994, pp. 290-297.

Bowers, M., et al., "Two-Phase Electronic Cooling Using Mini-Channel and Micro-Channel Heat Sinks: Part 2—Flow Rate and Pressure Drop Constraints," Journal of Electronic Packaging, vol. 116, Dec. 1994, pp. 298-305.

Bowers, M. et al., "High flux boiling in low flow rate, low pressure drop mini-channel and micro-channel heat sinks," Int. J. Heat Mass Transfer, vol. 37, No. 2, 1994, pp. 321-332.

Huang, H., et al., "Fuel-Cooled Thermal Management for Advanced Aeroengines," J. Eng. for Gas Turbines and Power, vol. 126, Apr. 2004, pp. 284-293.

Willingham, T.C., "Channel height effects on forced-convection boiling and critical heat flux from a linear array of discrete heat sources," Int. J. Heat Mass Transfer, vol. 35, No. 8, 1992, pp. 1865-1880.

U.S. Appl. No. 13/147,115, Notice of Allowance. May 24, 2013.

Office Action, Japanese Patent Application No. 2011-548429 dated Nov. 22, 2013.

\* cited by examiner

COILED AND MICROCHANNEL HEAT EXCHANGERS FOR METAL HYDRIDE STORAGE SYSTEMS

CROSS REFERENCE TO RELATED APPLICATION

This application is a national stage application of PCT/US2010/023192, filed Feb. 4, 2010, which claims the benefit of priority to U.S. Provisional Patent Application Ser. No. 61/149,920, filed Feb. 4, 2009, entitled MICRO-CHANNEL HEAT EXCHANGER FOR METAL HYDRIDE HYDROGEN STORAGE; U.S. Provisional Patent Application Ser. No. 61/149,931, filed Feb. 4, 2009, entitled COILED-TUBE HEAT EXCHANGER FOR METAL HYDRIDE HYDROGEN STORAGE; U.S. Provisional Patent Application Ser. No. 61/184,608, filed Jun. 5, 2009, entitled COILED HEAT EXCHANGERS FOR METAL HYDRIDE STORAGE SYSTEMS; and U.S. Provisional Patent Application Ser. No. 61/184,595, filed Jun. 5, 2009, entitled MICROCHANNEL HEAT EXCHANGERS FOR METAL HYDRIDE STORAGE SYSTEMS, all of which are incorporated herein by reference.

FIELD OF THE INVENTION

Various embodiments of the present invention pertain to heat exchangers and in particular to heat exchangers for cooling and heating of powders, and in particular heating and cooling of metal hydrides.

BACKGROUND

The ever increasing dependence on limited fossil fuel resources and resulting pollution have created an urgent need for cleaner fuel sources in pursuit of a more secure energy future. One alternate fuel source is hydrogen. Unlike fossil fuels, which produce energy by combustion and yield polluting byproducts, hydrogen is consumed by chemical reaction with oxygen forming only water as a byproduct. Thus, hydrogen has enormous potential as a clean power source for future generation of automobiles.

Automobiles require a pre-specified minimum mass of hydrogen to run for long distances before refueling. Calculations reveal 7 kg of hydrogen are used to run a vehicle for about 300 miles. The density of hydrogen at atmospheric temperature and pressure is 0.083 g/L while at a pressure of 700 bars it is 39.6 g/L. The 700 bar limit is set by the pressure rating for high-strength, lightweight carbon-fiber composite tanks. Further research is required to increase this limit by strengthening composite fibers and ensuring impermeability to hydrogen gas. The aforementioned density value means 7 kg of hydrogen gas at 700 bars would occupy about 220 liters. Such a volume is far too large to be stored on-board a vehicle. To reduce the volume to an acceptable level, hydrogen can be stored in liquid form at cryogenic temperatures. The density of liquid hydrogen at 20.3 K is 70.8 g/L, roughly twice the density of compressed hydrogen at 700 bars. Thus, cryogenic storage would use about 100 liters to store 7 kg of liquid hydrogen. Two disadvantages of liquid hydrogen storage are high-energy consumption, associated with the liquefaction process, and continuous boil-off during storage due to the difficulty in thermally insulating the liquid hydrogen at such low temperatures.

Another promising and practical alternative to high-pressure gas storage and cryogenic liquid storage is the use of metal hydrides. Many metals (M) and alloys can react reversibly with hydrogen to form metal hydrides.

$$M + 0.5 \times H_x \leftrightarrow MH_x + heat$$

The hydriding (forward) process of the reaction absorbs the hydrogen and releases heat, while the dehydriding (reverse) process requires heat input to release the hydrogen. The hydriding process is the process that occurs while filling the vehicle with hydrogen at the filling station. The dehydriding process occurs when the hydrogen stored in the metal hydride is de-absorbed to be used in the fuel cell for power production. The rates of both the hydriding (charging) and dehydriding (discharging) processes are highly dependent on temperature, i.e., they are kinetics-driven. The hydriding process preferably includes quick removal of the heat generated by the reaction for the process to proceed. If the heat is not removed efficiently, the temperature would rise to a level that can stall the reaction. This temperature limit is different for different metal hydrides and is about 80° C. for metal hydrides currently being tested in automotive research. The dehydriding process requires heating the metal hydride to a temperature that depends on chemical thermodynamics. The dehydriding process cannot occur without heating.

In the vehicle, heat is generated while charging the metal with hydrogen at the filling station. The 2015 target for refueling time is less than 5 minutes. In order to achieve such a fast refueling rate, it is helpful that the high-rate heat generation associated with the fast hydriding process be removed efficiently. Removing the heat is even more challenging with faster refueling rate (i.e., shorter refueling time) because of the greater rate of heat generation. Subsequent release of hydrogen from the metal hydride for fuel cell use is achieved by heating to a specific temperature.

The volumetric density of metal hydrides (volume occupied by hydrogen per unit volume of metal hydride) is comparable to that of liquid nitrogen. But a major disadvantage of metal hydrides is low gravimetric density (mass of hydrogen stored per unit mass of metal hydride). Hence, a heat exchanger that occupies a small volume and provides as much of the available storage space for the metal hydride is required to quickly and efficiently remove the heat as it is generated by the hydriding process. The heat exchanger should also allow for thermal expansion of the metal hydride at higher temperatures.

The operating pressure of metal hydrides is directly related to temperature. At a given temperature, the operating pressure should be higher than an equilibrium pressure for the hydriding process to occur. The equilibrium pressure depends on the temperature and thermodynamic properties of the metal hydride. Increasing the operating pressure increases the temperature limit above which the hydriding process stalls. Exceeding the equilibrium pressure corresponding to the afore-mentioned 80° C. temperature requires metal hydride operating pressures in the range of 400-500 bars. Hence the heat exchanger should be designed to withstand such high pressures.

Metal hydrides can be available in powder form, or formed into pellets of any desired shape. Hence, the heat exchanger in a hydrogen vehicle is a storage device for metal hydrides that can provide sufficient cooling at high pressures to maintain temperature levels that render the hydriding and dehydriding processes highly efficient.

SUMMARY OF THE INVENTION

Various embodiments of the present invention pertain to apparatus and methods for removing heat, especially for transferring heat from a powder to a liquid.

One aspect of the present invention pertains to an apparatus for exchanging heat between a medium and a substance. Some embodiments include a pressure vessel having a first port for receiving a heat exchanging medium returning the medium. Yet other embodiments include a plurality of heat exchanging modules within the interior of the vessel, each module being in fluid communication with another module. Some embodiments further include a first plate having a plurality of fins, and a second plate having a plurality of fins. Sides of the plates are in contact and define a passage therebetween for the medium Yet another aspect of the present invention pertains to an apparatus for exchanging heat between a medium and a substance. Some embodiments include a pressure vessel having ports for receiving and returning the medium, said pressure vessel defining an interior. Still further embodiments include at least one tube including an outer spiral extending within the vessel and an inner spiral located within the outer spiral. The substance substantially surrounds each of the spirals In some embodiments, the maximum distance from any portion of the substance to the tube is kept under a maximum allowable distance. In some embodiments, this distance is less than about 20 mm It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these myriad combinations is excessive and unnecessary.

DESCRIPTION OF THE PREFERRED EMBODIMENT

Figure 1:
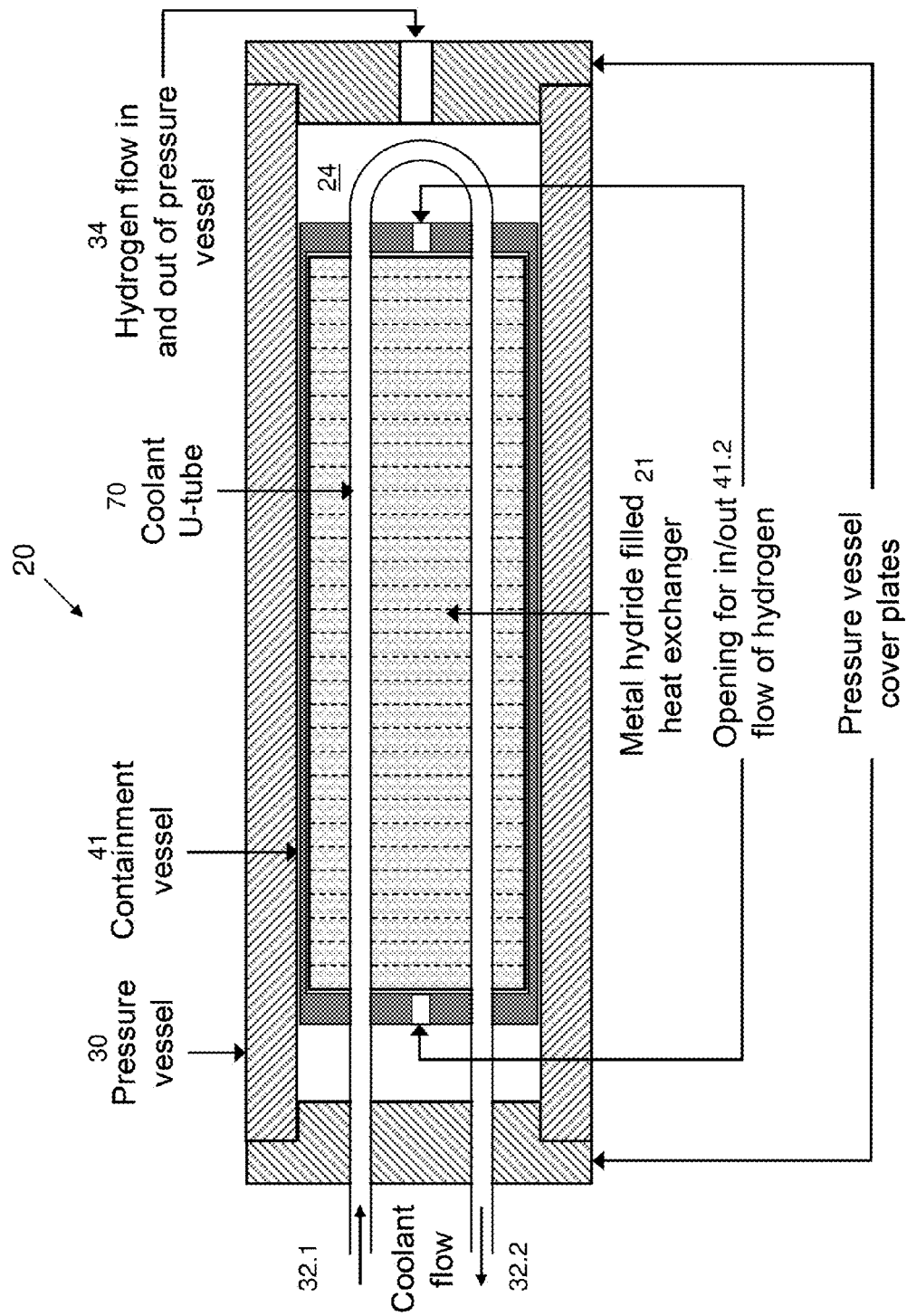
FIG. 1 is a cross-sectional schematic representation of a gaseous storage system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that must be included in all embodiments, unless otherwise stated.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, etc.) may be stated herein, such specific quantities are presented as examples only. Further, discussion pertaining to a specific composition of matter, that description is by example only, does not limit the applicability of other species of that composition, nor does it limit the applicability of other compositions unrelated to the cited composition.

Various embodiments of the present invention pertain to a gaseous storage system. In one embodiment, the system includes a quantity of a gas-absorbing solid material placed within a pressure vessel. The pressure vessel also contains one or more heat exchangers for transferring heat into and out of the solid substance as a gas is desorbed or absorbed, respectively.

Yet other embodiments of the present invention pertain to configurations of heat exchangers. In some embodiments, these heat exchangers are configured to transfer heat into and out of a solid substance and into a liquid cooling medium. However, other embodiments of the present invention contemplate the transfer of heat into and out of a substance in any physical state (gas, liquid, or solid) and into a fluid medium (gas or liquid).

Yet other embodiments of the present invention pertain to methods and apparatus for constructing a heat exchanger. In one embodiment, there is a generally cylindrical heat exchanger with at least one central cooling passage and a plurality of fins radiating outwardly from that passage. In some embodiments the fins interconnect a hub with an outermost ring. The hub includes at least one passage for the flow of a cooling medium. The material being heated or cooled is placed between the hub and the outer ring. Preferably the fin pattern is arranged so that the body of the heat exchanger can be extruded from a material, such as aluminum.

Yet another embodiment of the present invention pertains to a heat exchanger with low contact resistance from a plurality of heat conducting fins to a cooling medium. In some embodiments this is accomplished by arranging the fins such that they transfer heat to a common hub. A coolant tube passes through the hub. In some embodiments the hub defines a conically-shaped inner diameter and the cooling tube defines a complimentary-shaped conical outer diameter. The hub and fins can be slid along the length of the cooling tube until there is a tight fit between the hub I.D. and the tube O.D. The hub can be maintained in the tight-fitting configuration by a fastening device that couples to one of the hub or the tube and pushes against (or pulls against) the other of the hub or the tube.

Various embodiments of the present invention pertain to apparatus and methods for removing heat from a pressure vessel in which a gas is absorbed onto a metal, such as a metal powder. In certain embodiments, the absorbed gas is hydrogen, and the solid substance is a metal hydride powder. However, it is understood that other embodiments are not so limited and pertain to the cooling or heating of the gas absorption process in general, and in some embodiments with regards to containment of the absorption reaction in a pressure vessel.

With regards to the absorption of hydrogen in a metal hydride, there is heat given off during the absorption reaction. It is desirable to remove this heat both to increase the rate at which the hydrogen is absorbed within the hydride material, and further to maintain acceptable and safe temperature of the pressure vessel assembly. In some applications, the hydrogen gas is stored for later use in propulsion of a vehicle, such as an automobile that is powered by a fuel cell.

In such applications, it is desirable to configure the pressure vessel and the filling method such that the tank can be substantially full within a commercially-acceptable period of time. In one embodiment, the acceptable period of time is about 300 seconds, although it is understood that this fill time is not a limitation on any embodiment of the present invention, and further that other embodiments contemplate the configuration of the apparatus and method to achieve acceptable fill times for the particular application. In some applications, the heat exchangers are configured not to achieve a particular fill time, but instead to achieve a particular heat flux. As one example, in some military applications, various embodiments of the present invention can be used not only to achieve desirable fill times, but also to achieve desirable levels of heat generation, especially for those applications in which the heat is used in another apparatus or method. For example, the heat given off during the hydriding reaction can be used to power any Carnot cycle engine, or be used in any application in which the addition of heat is desirable.

One aspect of some embodiments of the present invention pertains to heat exchangers that can be substantially filled with hydrogen in under 300 seconds. Various versions of a two dimensional analytical modal were analyzed, a candidate configuration was selected from those versions and that candidate version was constructed and tested.

In the computer modeling of the various heat exchanger configurations, some of the following parameters were used: (1) the pressure vessel had an inner diameter of about four inches; (2) the tube for providing coolant had an outer diameter of about three-eighths inches, and a wall thickness of about one-sixteenth inch; (3) the initial temperature of the pressure vessel was about twenty degrees C.; (4) the contact resistance from the metal hydride to the conducting surface of the heat exchanger was about one-thousandth millimeters squared—degrees Kelvin per watt; (5) the coolant medium was Dexcool® at a flowrate of about twenty liters per minute with a pressure differential from the coolant inlet to the coolant outlet of about seven bars; (6) the pressure vessel was pressurized with hydrogen with a pressurization profile from one bar to five-hundred bars in sixty seconds, with a constant maximum pressure held thereafter; (7) the pressure vessel contained about six kg of hydrogen; and (8) the length of the pressure vessel was less than about one meter.

The metal hydride selected for the modeling and subsequent testing is a hydride that incorporates Titanium, Chromium, and Manganese. In particular, a composition of the formula Ti(1.1)CrMn was used. However, various embodiments of the present invention are not so constrained, and the apparatus and methods described and claimed are applicable with any type of solid material in which a gas is absorbed, and in particular to any type of metal hydride.

Various parameters of the reaction kinetics are provided in Table 1, below.

TABLE 1

| Symbol | Value | Units |
| --- | --- | --- |
| Ca (Activation rate) | 150 | 1/s |
| Ea (Activation Energy) | 20,700 | J/mol-H2 |
| delta- S (enthalpy change) | −113.4 | J/K-mol-H2 |
| Cp (sp. heat of MH) | 500 | J/kg-K |
| MW_H2 | 2.0158 | g/mol |

These modeling parameters are given by way of example only. As in any modeling exercise, one or more of the aforementioned parameters were varied over a range. Further, it is understood that these parameters do not necessarily describe the claimed apparatus or methods.

Figure 3:
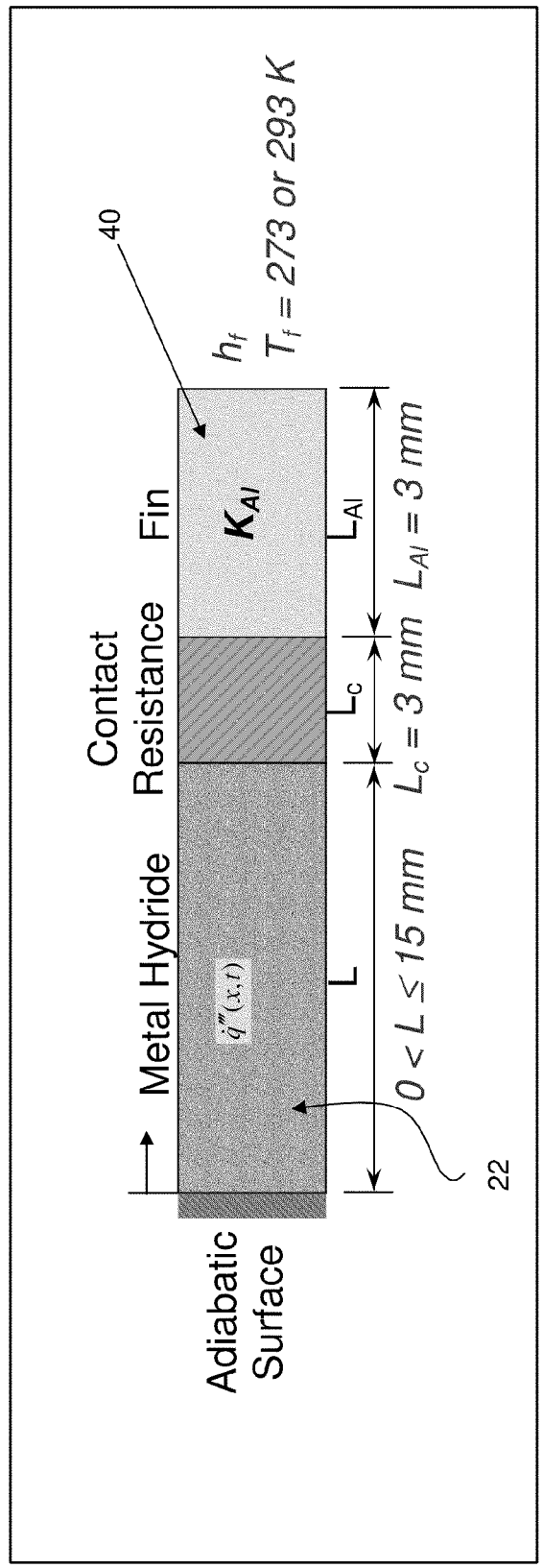
FIG. 3 is a schematic representation of a one dimensional heat transfer model.

Some computer modeling was performed with a one dimensional model created in Matlab®. This model helped provide an estimate of the allowable pocket widths for the metal hydride material, and further to understand the affect of various parameters such as the metal hydride (MH) properties, pressurization profile, contact resistance, coolant temperature, flowrate, and others on the performance of the heat exchangers (including ease of manufacturing, handling, weight, volume and cost) and further on the fill times. With the use of the one-dimensional model (refer to FIG. 3), different two-dimensional heat exchanger design models were created in Fluent® and their performance was analyzed by varying a variety of parameters.

Figure 2:
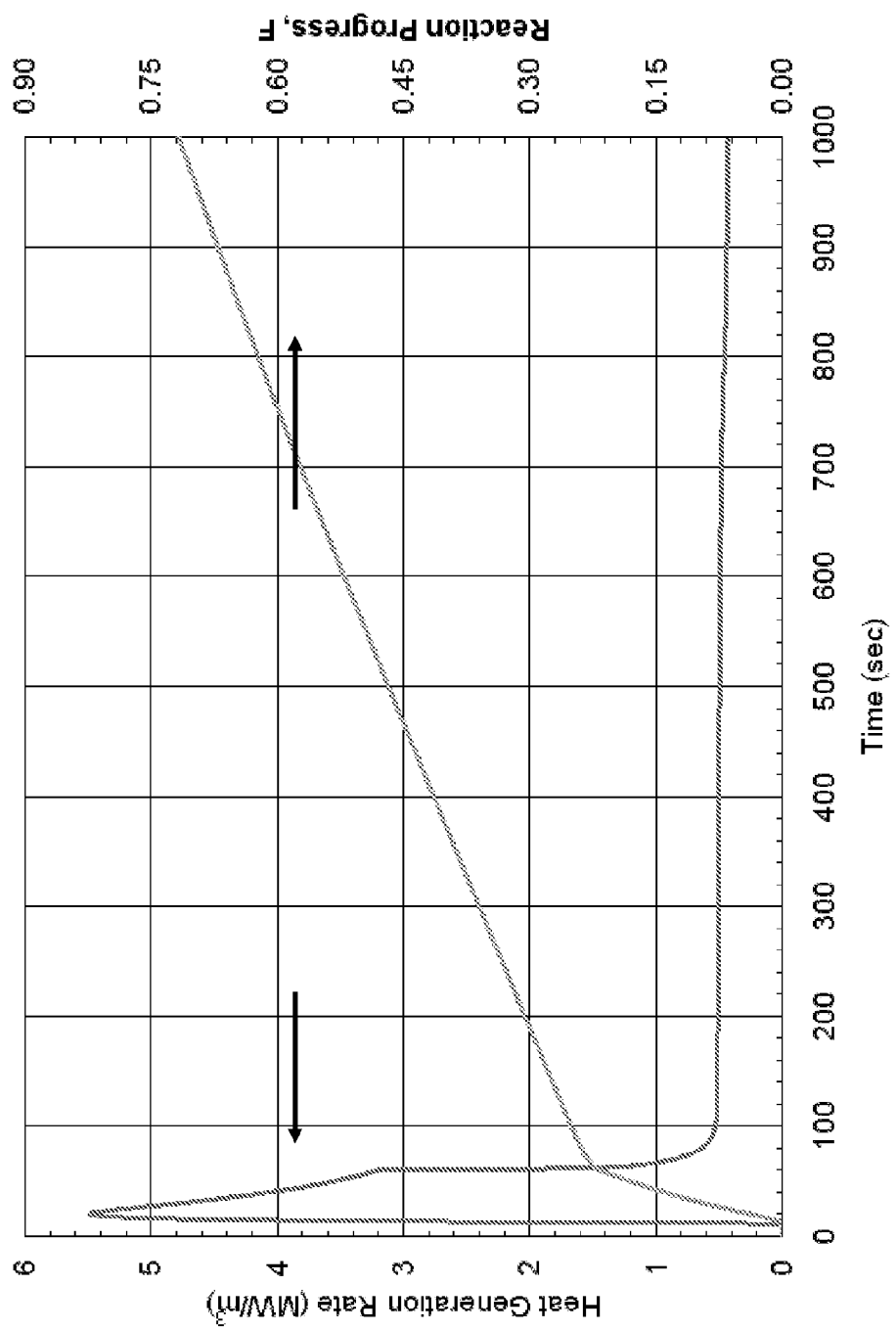
FIG. 2 is a graphical representation of time-based parameters relating to a hydriding reaction.

FIG. 2 is a time-based graphical representation of two parameters related to filling of the pressure vessel: heat generation rate and the percent completion of the reaction (reaction progress). Referring to the left most vertical axis, it can be seen that there is a substantial spike in heat generation at about twenty seconds, which then falls to a low, near-constant value at about one-hundred seconds. During this early period, it can be seen that the reaction rate is fairly linear at a first, higher rate, and then at about sixty seconds changes to a second, reduced linear rate. This plot shows that there is substantial heat given off by the filling operation in the first minutes of operation.

From the one-dimensional modeling, it was found that there is a maximum allowable width for a pocket, taking into account various quantities such as the density, specific heat, and thermal conductivity of the hydride; the void characteristics of the hydride; the pressure history of the pressure vessel; the enthalpy and entropy associated with the materials and the reactions; and others. It was found that in some systems, for a pressure vessel as previously described and for a fill time of 300 seconds or less, that the pocket of metal hydride should be less than twenty millimeters from a cooling fin, and preferably less than fifteen millimeters from a cooling fin. It was also found that contact resistance is helpful in reducing the fill time. Lowered contact resistance (as from the hydride to the fin, and further from the hub to the coolant tube) lowers the fill time. Further reduction in fill time can be obtained by increasing the coolant flowrate.

Figure 4A:
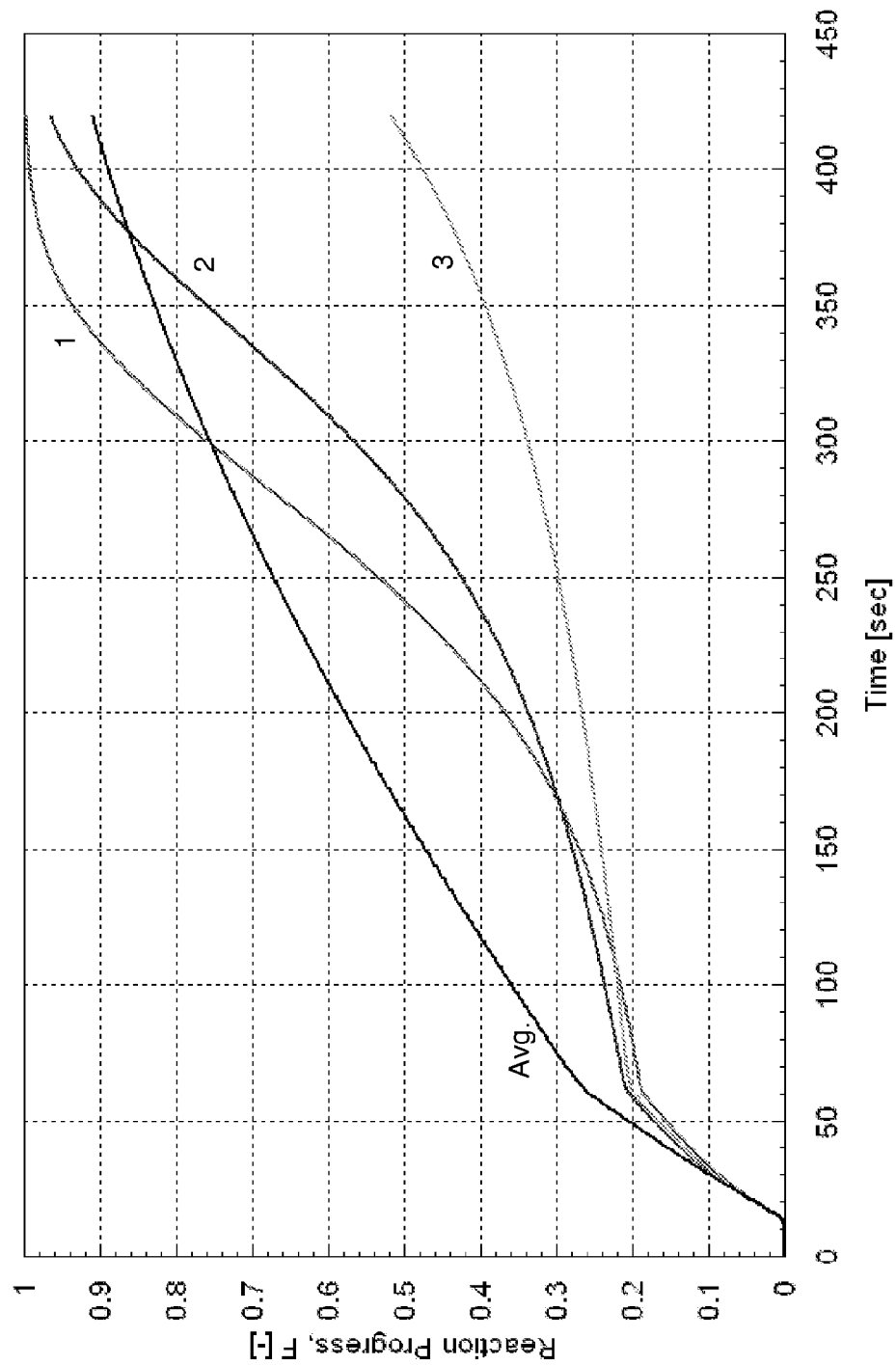
FIG. 4a is a graphical, time-based representation of reaction progress of a hydriding reaction within different pockets of a hydride material.
Figure 4B:
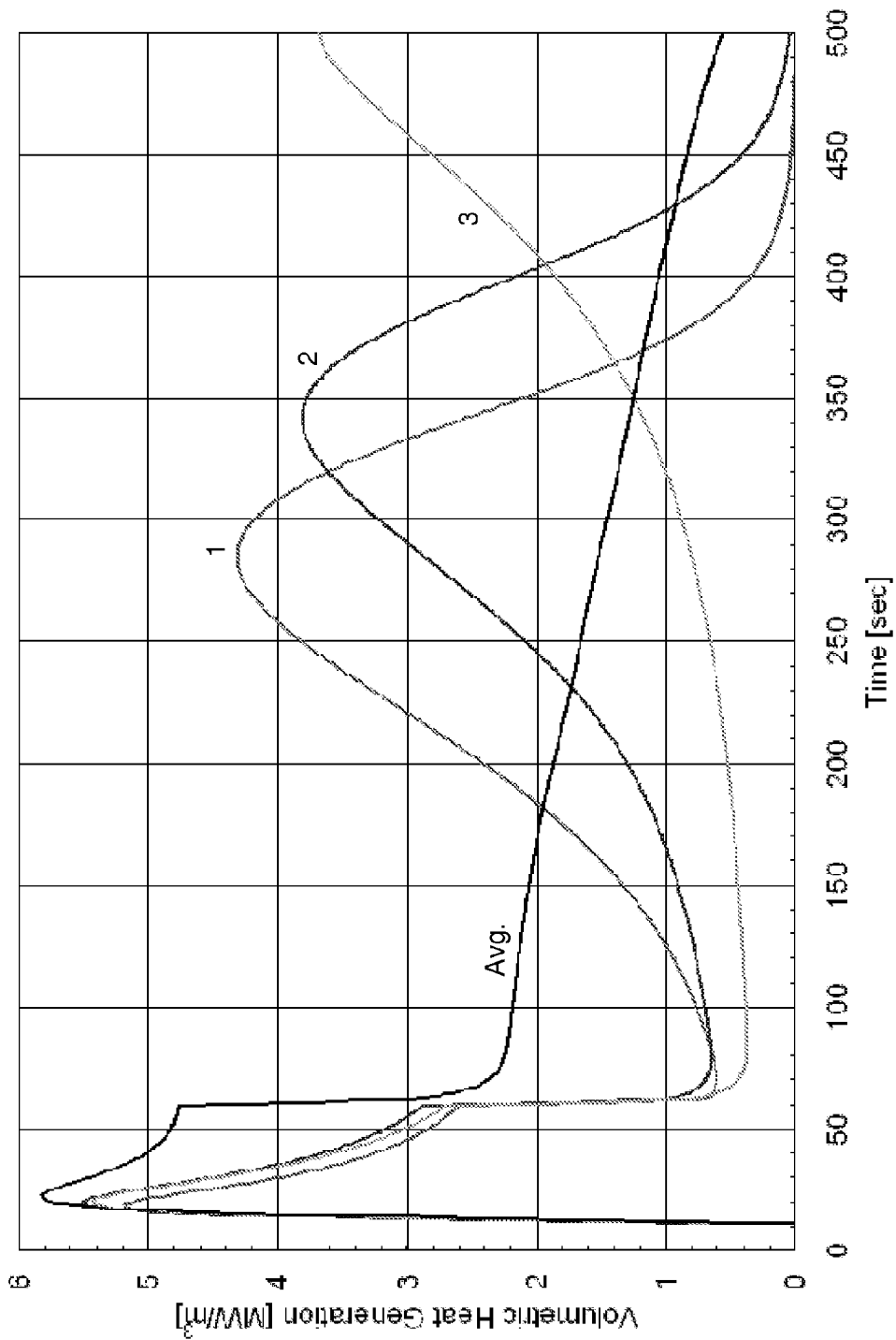
FIG. 4b is a graphical, time-based representation of heat generation for a hydriding reaction within different pockets of hydride material
Figure 4C:
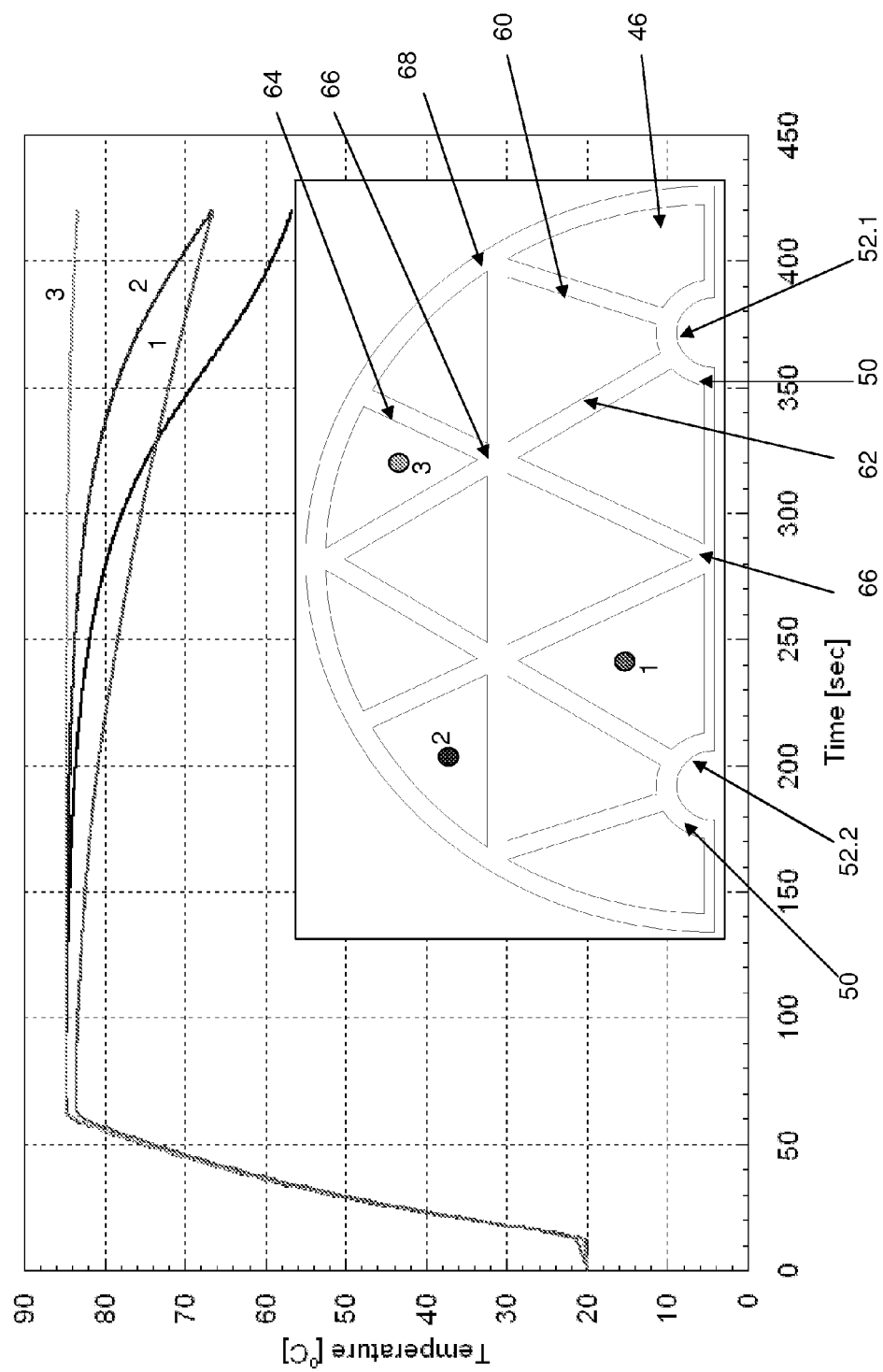
FIG. 4c is a graphical, time-based representation of the temperature of the metal hydride within different pockets of hydride material.
Figure 4D:
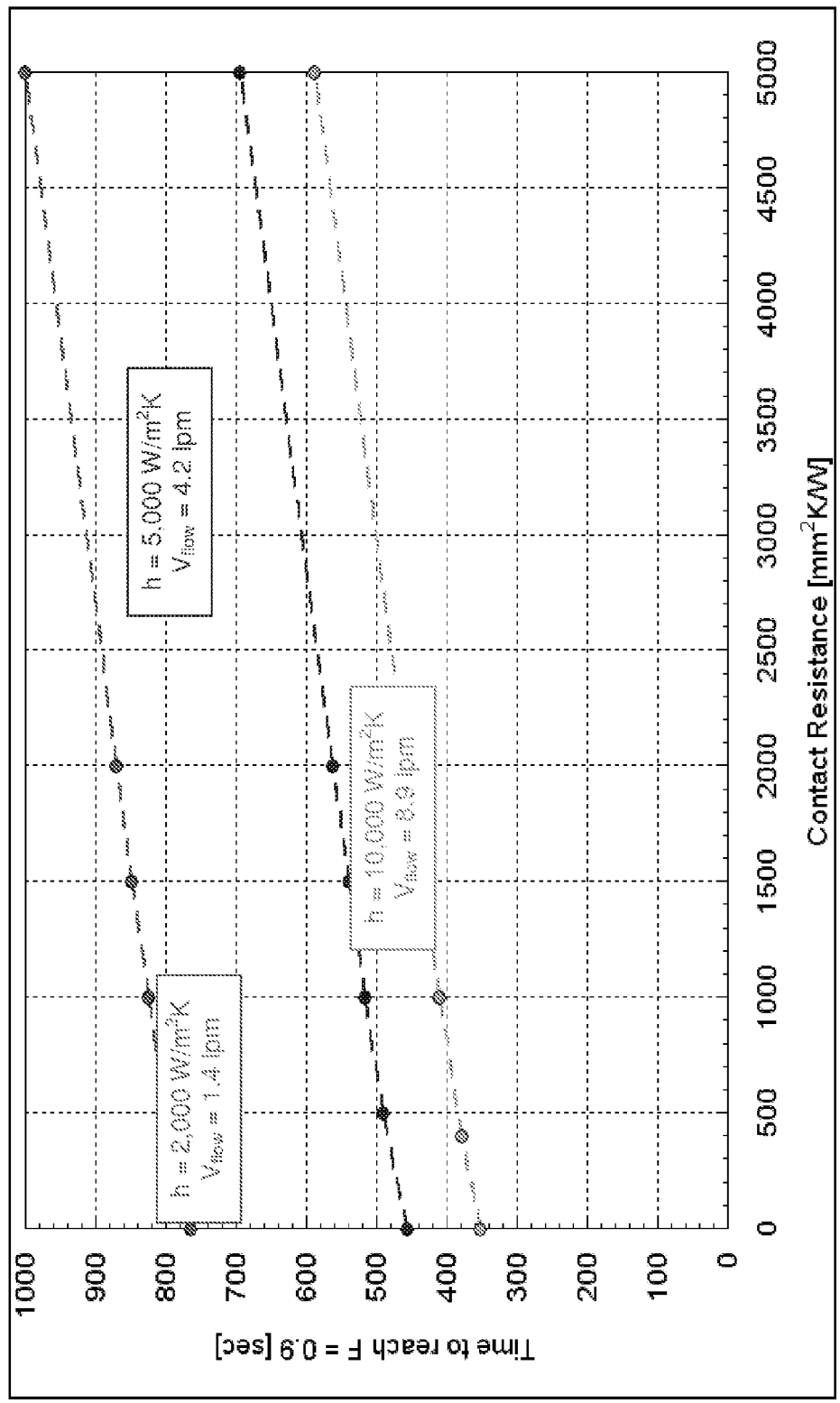
FIG. 4d is a graphical representation of the time estimated to reach a ninety percent full container as functions of coolant convective coefficient and contact resistance.
Figure 5:
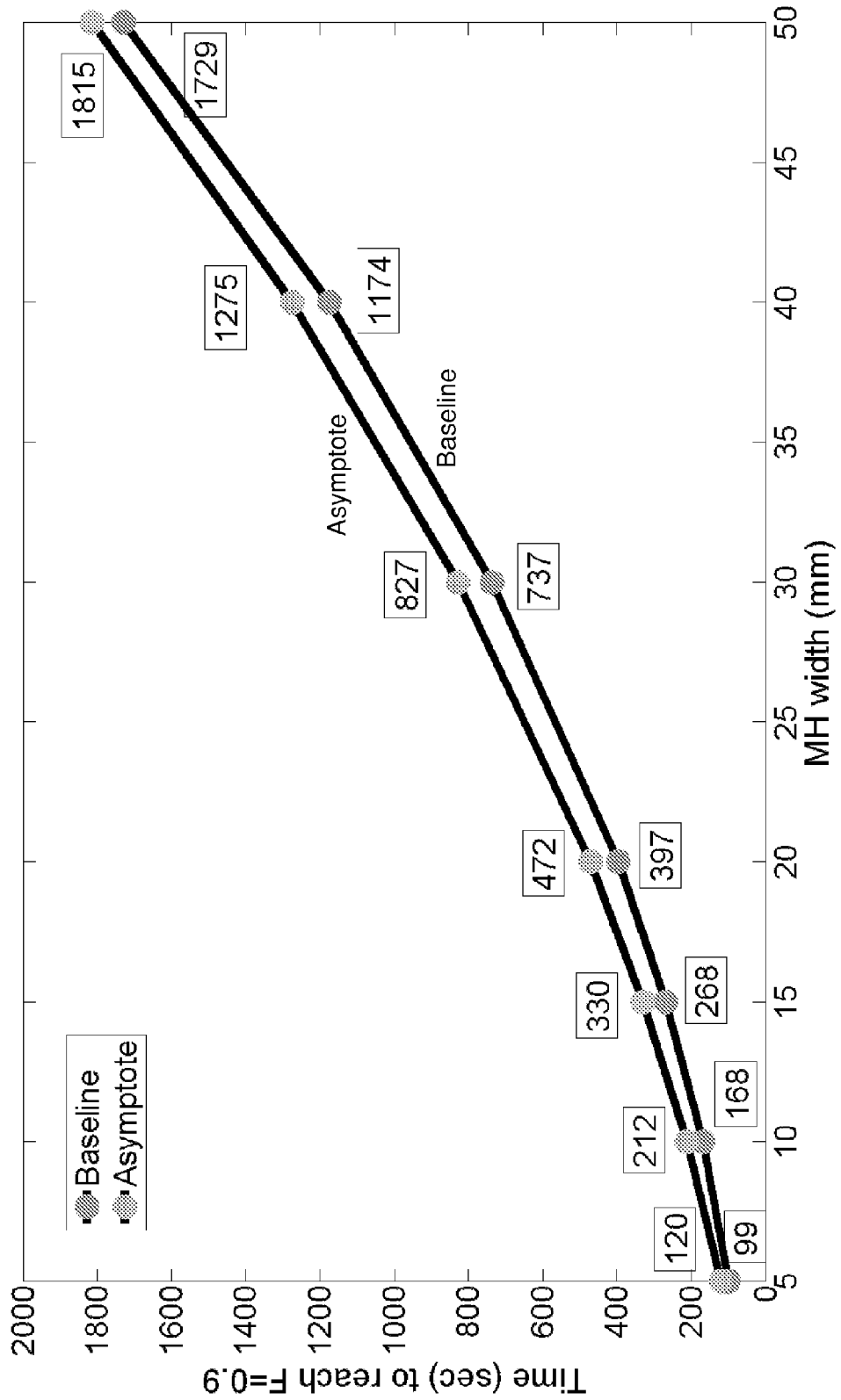
FIG. 5 is a graphical representation of the time to reach a ninety percent full container as a function of the width of the metal hydride pocket.

Some of the analytical results are shown in FIG. 5. It can be seen that for a fill time to reach a fill rate of 0.9 in 300 to 400 seconds, that the width of the metal hydride pocket should be in the range of twenty to fourteen millimeters. In FIG. 4, the bottom curves are the analytical results for the Ti—Cr—Mn composition, and the top line (labeled Asymptote) was for a different metal hydride material.

Various embodiments of the present invention incorporate a design philosophy that relates to a minimum size for a pocket of metal hydride. The configuration of the pocket is established by the cooling fins or other cooled structure that surround the pocket. It has been discovered that, in order to achieve a pressure vessel reasonably full of hydrogen in a commercially-acceptable period of time, that there is a minimum distance from the center of the pocket to the nearest cooled fin or cooling tube Further analysis with a two dimensional model was performed, and the graphs of FIGS. 4a, 4b, and 4c represent some of those analytical results. As is best seen in FIG. 4c, temperatures during a hydriding reaction are shown as a function of time in three pockets of a finned plate (referring to the inset of FIG. 4c). FIG. 4c shows the predicted temperatures in the three pockets as a function of time, and also a calculated average temperature for the hydride. FIG. 4a shows the reaction rate within the three pockets (and also for the average) as a function of time. This figure shows that those pockets more distant from the central passages (such as pocket 3) achieve less progress in the hydriding reaction as a function of time. As can be seen in FIG. 4b, those most distant pockets also have generated heat loads later in time than pockets closer to the cooling passages (such as pocket 1).

FIG. 4d further shows the effects of contact resistance and convective coefficients on the time required to achieve a reaction progress factor of nine-tenths. The top line shows that for a convective coefficient of two-thousand W/m²K and a flowrate of about one and one-half liters per minute, ninety percent fill can be reached in about 770 seconds. The bottom line shows that for a convective heat transfer of ten-thousand W/m²K and a flow of about nine liters per minute, the time to reach ninety percent full is about 350 seconds. It can be seen that both contact resistance and the convective coefficient influence the performance of the heat exchanger. Generally, and in some embodiments, the convective coefficient has a more pronounced effect on heat exchanger design than contact resistance. However, for high values of contact resistance, the convective coefficient has to be increased correspondingly in order to achieve a desired fill time. Therefore, some embodiments of the present invention include features such as slotted, tapered sleeves to decrease the contact resistance between the hub and the coolant tube.

FIG. 1 shows an external view of a gaseous container assembly 20 according to one embodiment of the present invention. Container 20 includes a plurality of heat exchanger modules 21 that are generally surrounded with a gas absorbing material 22. In one embodiment, material 22 in some embodiments is any type of a metal hydride composition for storage of hydrogen. However, other embodiments of the present invention contemplate gas absorbing materials other than metal hydrides for storage of gases other than hydrogen. Further, various embodiments of the present invention contemplate the use of materials 22 that are in solid form, including powders.

In one embodiment, a quantity of gas 24 (such as hydrogen) is stored within material 22. The process of absorbing and desorbing the gas into the material is expedited either by the cooling (for absorption) or heating (for desorption). Therefore, various embodiments of the present invention contemplate the use of a heat exchanging medium (such as Dexcool®), although any fluid medium (liquid or gaseous) is contemplated. In some embodiments, container 20 further includes a material 28 that enhances internal thermal conductivity, such as an inert high conductivity powder 28.1 or a high conductivity mesh or lattice work, as examples.

The quantity of gas that can be stored within container 20 is increased by the use of higher pressure. Therefore, some embodiments contemplate that container assembly 20 includes a pressure vessel 30 preferably shaped so as to efficiently accommodate the pressure differential across outer wall 30.1, including shapes such as a cylindrical shape or a spherical shape. In some embodiments, the pressure vessel has about one-hundred bar across the outer wall of the pressure vessel. In yet other embodiments, the pressure vessel has a pressure differential of five-hundred bar across the outer wall. Because of the types of material, configurations, and thicknesses of material that must be used to accommodate such high pressure differentials, various embodiments of the present invention contemplate that the heat exchanging modules 21 within the pressure vessel do not have a substantial pressure differential across any part of the heat exchanging modules. Referring to FIG. 1, in one embodiment pressure vessel 30 is generally cylindrical having first and second ends 30.2 and 30.3, respectively, respectively, which can be spherically domed (not shown) to improve the distribution of stresses within the ends.

Figure 6:
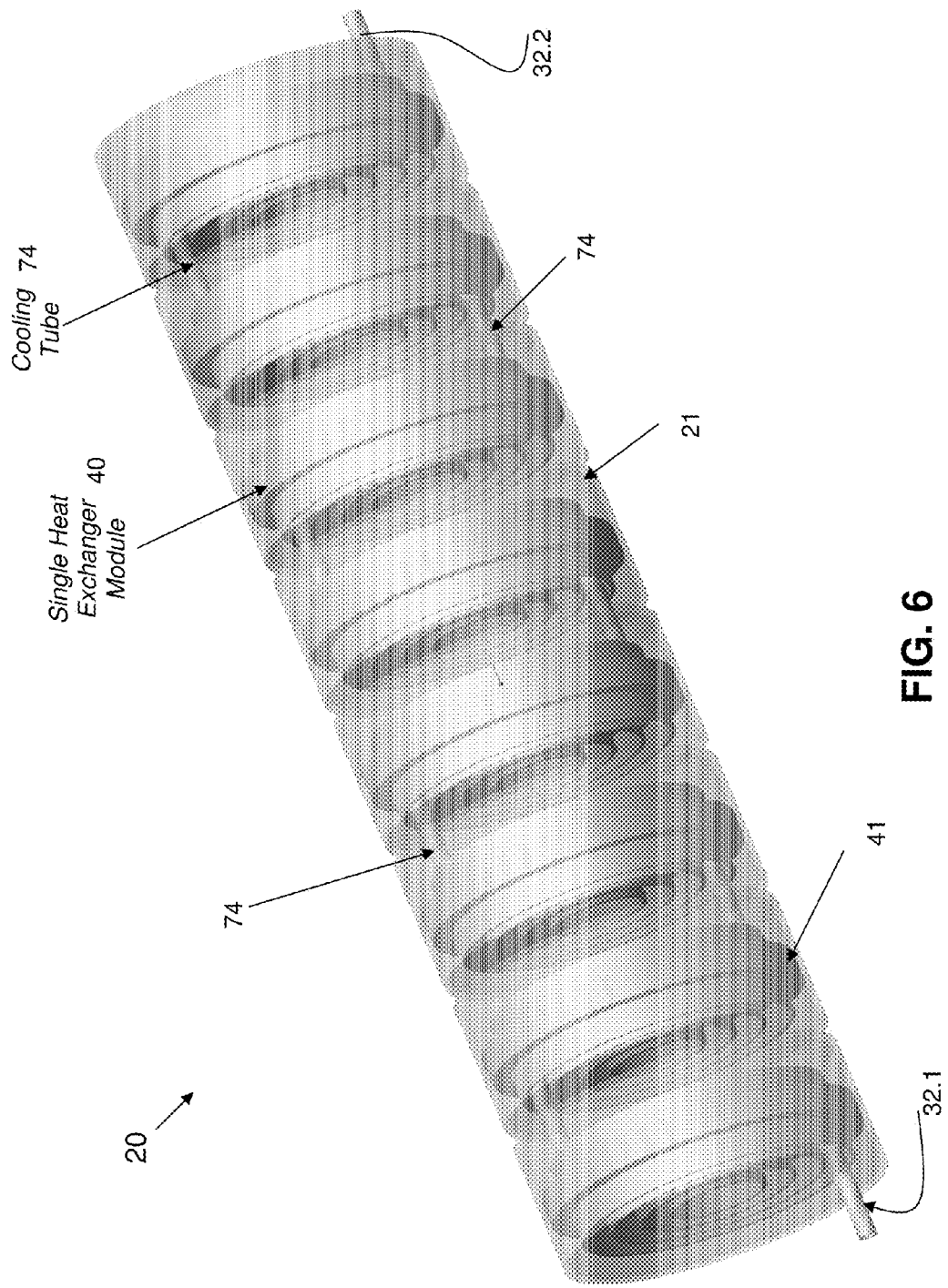
FIG. 6 is a 3-D, perspective, partially transparent representation of a portion of a pressure vessel according to another embodiment of the present invention.
Figure 7:
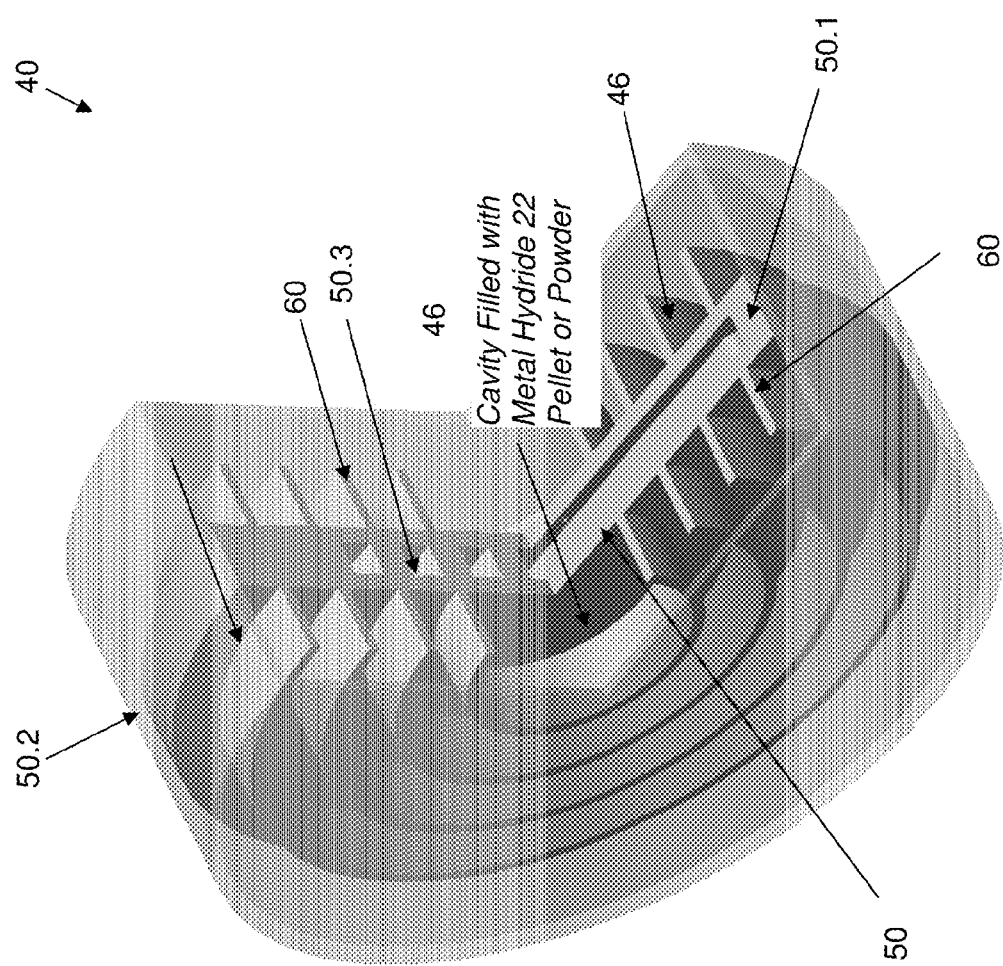
FIG. 7 is a 3-D, partially transparent cutaway view of a heat exchanger module from the apparatus of FIG. 6.
Figure 8:
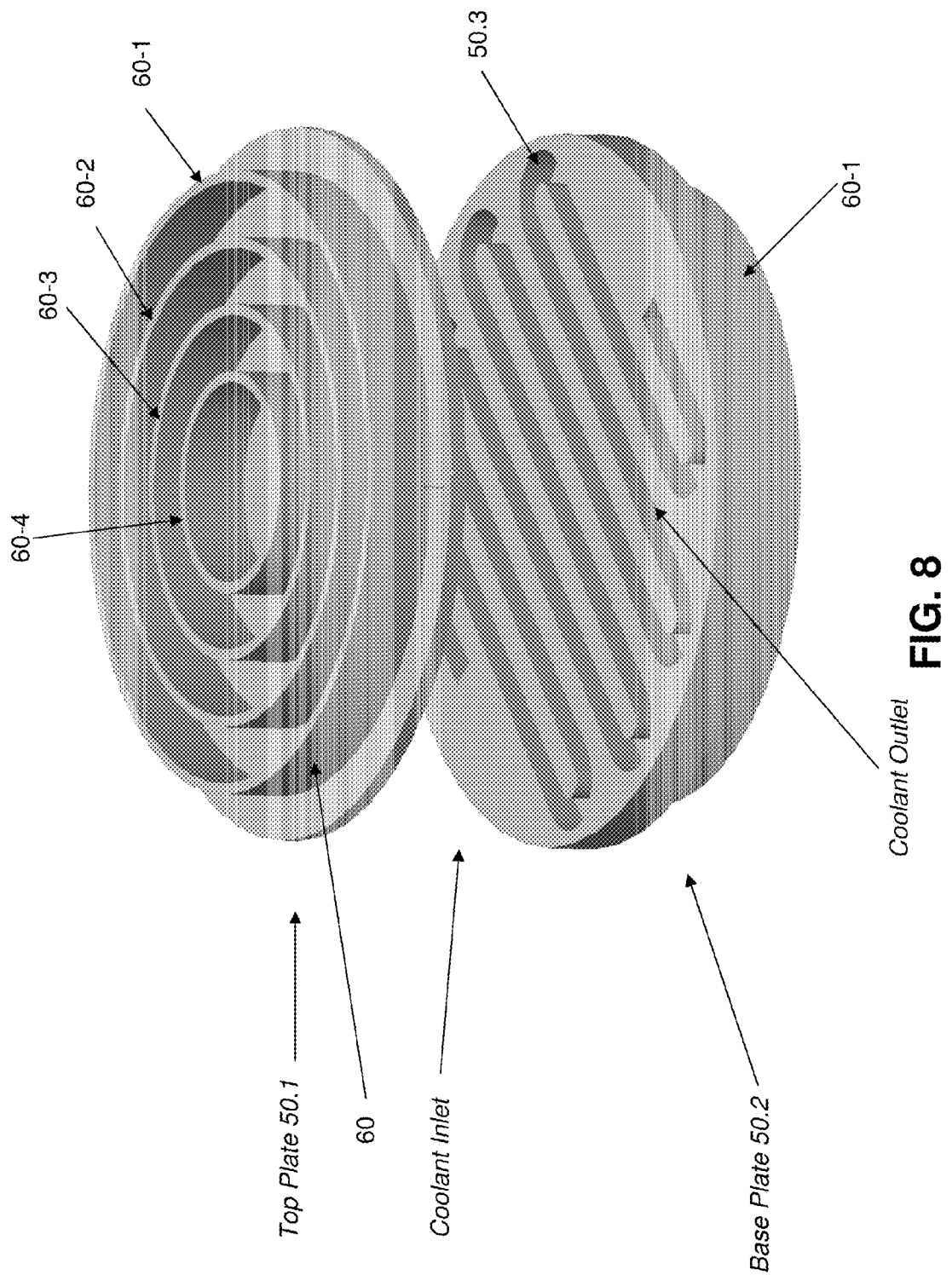
FIG. 8 is an exploded view of a portion of the apparatus of FIG. 7.

FIGS. 6, 7, and 8 show schematics of a modular heat exchanger for metal hydride hydrogen storage. Not shown in these figures is the pressure vessel surrounding the heat exchanger components. Pressure vessel 30 is shown schematically in FIG. 1. The heat exchanger 21 includes several identical modules 40 that are cooled by liquid pumped through cooling tubes 74. Each module 40 includes a high thermal conductivity base 50.2 and cover plates 50.2 and 50.1, respectively, that are preferably brazed together following fabrication. The base plate 50.2 is grooved with a serpentine micro-channel for liquid coolant flow. Both the base plate 50.2 and the top plate 50.1 feature external circular fins 60. A metal hydride pellet 22.3 is preferably formed to fit into the cavities 46 between the fins on both sides of the assembled module. Alternatively, a metal casing 41 (shown partly transparent in FIG. 6) that surrounds the module is filled with metal hydride powder.

Several features of the module design enhance the effectiveness of cooling the metal hydride. As one example, the metal hydride is maintained in close proximity to the fin surfaces in order to decrease thermal resistance. Second, the small diameter of the serpentine channel 50.3 increases the heat transfer effectiveness of the liquid coolant. In some embodiments, the hydraulic diameter of channel 50.3 is less than about 1 mm. As another example, the thermal conductivity of the metal hydride is increased by mixing high conductivity powder or metal mesh into the pellet or powder.

The shape of the grooves within the base plate may be modified to enhance cooling effectiveness and reduce weight. Also, the single micro-channel may be replaced with two or more parallel micro-channels that share the same inlet and outlet, but providing parallel flow channels in different portions of the base plate. Additionally, the serial cooling configuration depicted in FIGS. 6, 7, and 8 may be replaced by a parallel configuration, where one large cooling tube supplies coolant to the individual modules and a second to reject the coolant from the modules. A variety of fin shapes and configurations other that those shown in FIGS. 6, 7, and 8 are possible.

Various embodiments of the invention shown herein can include one or more aspects to their design. Some embodiments include modular design that facilitates replacing defective modules. Other embodiments include adaptability to use with metal hydride pellets. Yet other embodiments include adaptability to use with metal hydride powder with the aid of a casing. Still other embodiments include shaping the metal hydride to maintain a small distance of metal hydride from the fin surfaces. Some embodiments include the use of microchannels to greatly enhance heat transfer effectiveness of the liquid coolant and reduce coolant flow rate. Yet other embodiments include mixing high conductivity powder or metal mesh into the pellet or powder to enhance overall thermal conductivity of the metal hydride. Still further embodiments include use of a simple-to-fabricate circular fin shape. Other embodiments include Use of an economical and compact brazed module design.

FIG. 6 shows a portion of a gaseous container assembly 20 according to one embodiment of the present invention. Assembly 20 includes a heat exchanging assembly 21 comprising a plurality of heat exchanger modules 40. Assembly 21 is located within a pressure vessel 30 (not shown). Assembly 21 as shown in FIG. 6 includes eight heat exchanging modules 40 although it is understood that any number of modules 40 can be used dependent upon the specific application for the container 20.

Each module 40 is in fluid communication with the modules on either side of it by fluid connectors 74. Therefore, assembly 21 includes a substantially continuous flowpath from an inlet 32.1 at a proximal end of the cylindrical container 20 to an outlet 32.2 located at the distal end of the container assembly 20.

FIG. 7 shows a single heat exchanging module 40 according to one embodiment of the present invention. Module 40 includes a hub assembly 50 in thermal communication with a plurality of fins 60. A gas absorbing material 22 substantially surrounds the fins and hub, all of which is contained within a containment vessel 41, which in one embodiment is a metal casting. However, it is understood that the present invention is not so limited, and contemplates a vessel 41 for containment of the gas absorbing material fabricated from any type of material and from any type of fabrication method.

In one embodiment, hub 50 is substantially shaped as a flat plate with a pattern 60.1 of concentric fins extending axially outward from each flat surface. The gas absorbing material 22, such as a metal hydride powder, fills all of the pockets 46 extending from the opposing surfaces of hub 50, between all fins 60, and out to the containment vessel 41. Preferably, the pattern 60.1 of fins is arranged so that each pocket 46 includes a quantity of hydride powder that is no further than about twenty millimeters from a fin or the hub, and in some embodiments no more than about fifteen millimeters from a fin or the hub.

In one embodiment, the pattern 60.1 of fins 60 is a series of concentric circles extending generally perpendicularly from a face of cylindrical hub 50. Referring to FIG. 8, an outermost ring 60-1 extends closest to the outmost edge of hub 50. Progressively smaller inner rings 60-2, 60-2, and 60-4 extend toward the center of the cylindrical shape.

However, the present invention is not limited to the pattern shown in FIGS. 7 and 8, and further includes non-concentric circular fins, and circular fins that are not nested one within the other. Yet other embodiments contemplate non-circular fins, and including fins that are substantially linear, and further those shapes that are extrudable. In yet another embodiment, the pattern of fins can be a crisscrossing of fins in a checkerboard pattern. Further, although an extruded configuration has been described, the finned surfaces are not so limited, and can further be cast integrally with plates of the hub, or brazed to the hub, welded to the hub, or connected in any manner providing low contact resistance.

Figure 9:
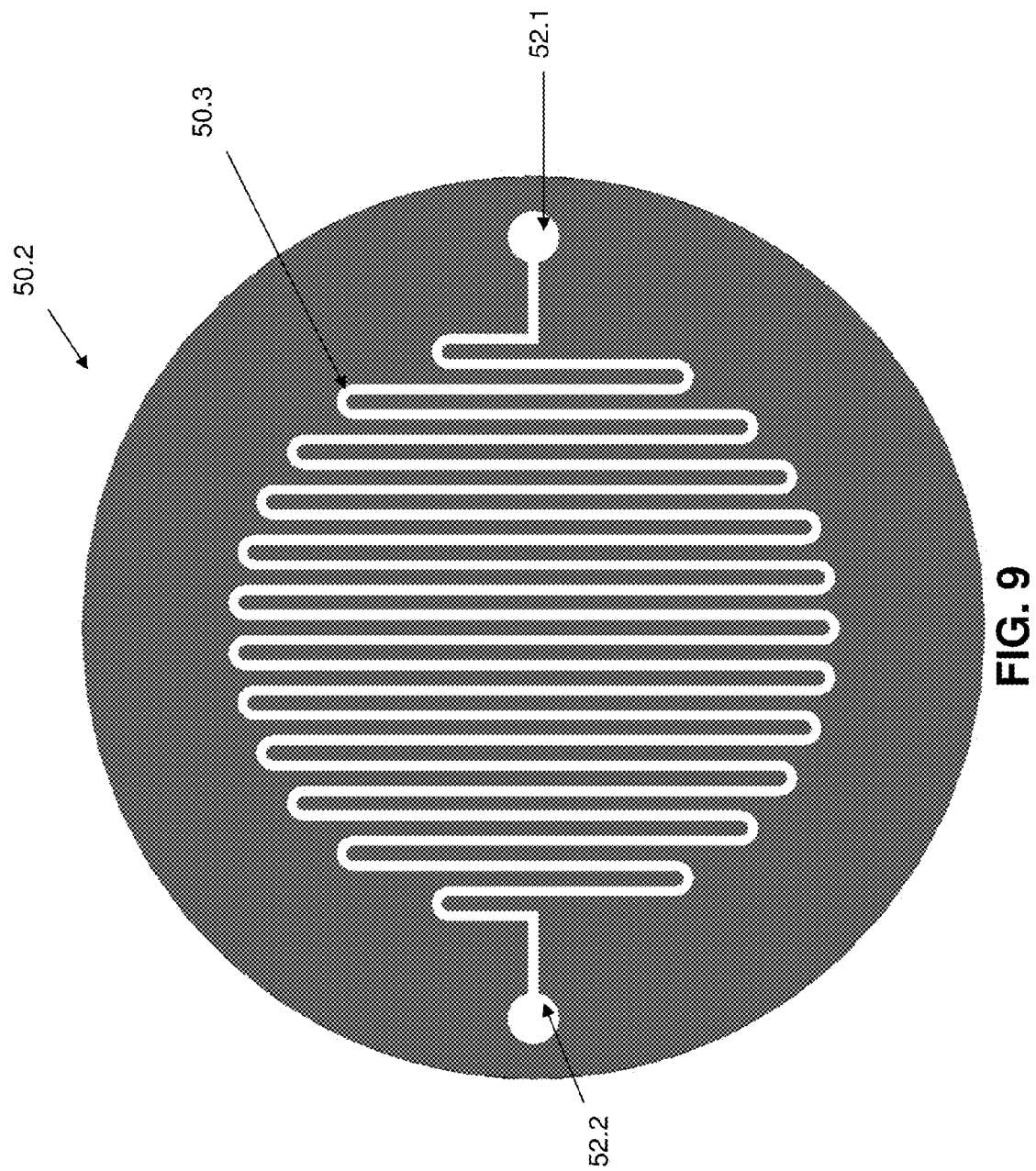
FIG. 9 is a plan view of a portion of the apparatus of FIG. 8.

As can be further seen in FIGS. 7 and 8, each hub 50 comprises first and second plates 50.1 and 50.2, which are shown in exploded fashion in FIG. 8. Preferably, each plate 50.1 and 50.2 includes a pattern 60.1 of fins 60 extending from one side. The other, facing side of each plate 50.1 and 50.2 are preferably attached to each other and define therebetween a cooling channel 50.3. In one embodiment, and as best seen in FIGS. 8 and 9, cooling channel 50.3 can have a serpentine shape extending from an inlet 52.1 located proximate the periphery of a plate 50.2 extending to an outlet 52.2 located on the opposite end of the channel. As discussed earlier with regards to FIG. 6, the inlet passage 52.1 of a first hub 50 is in fluid communication with the outlet 52.2 of an adjacent hub 50. In one embodiment, cooling channel 50.3 is a microchannel, having a hydraulic diameter less than about one millimeter.

Figure 10:
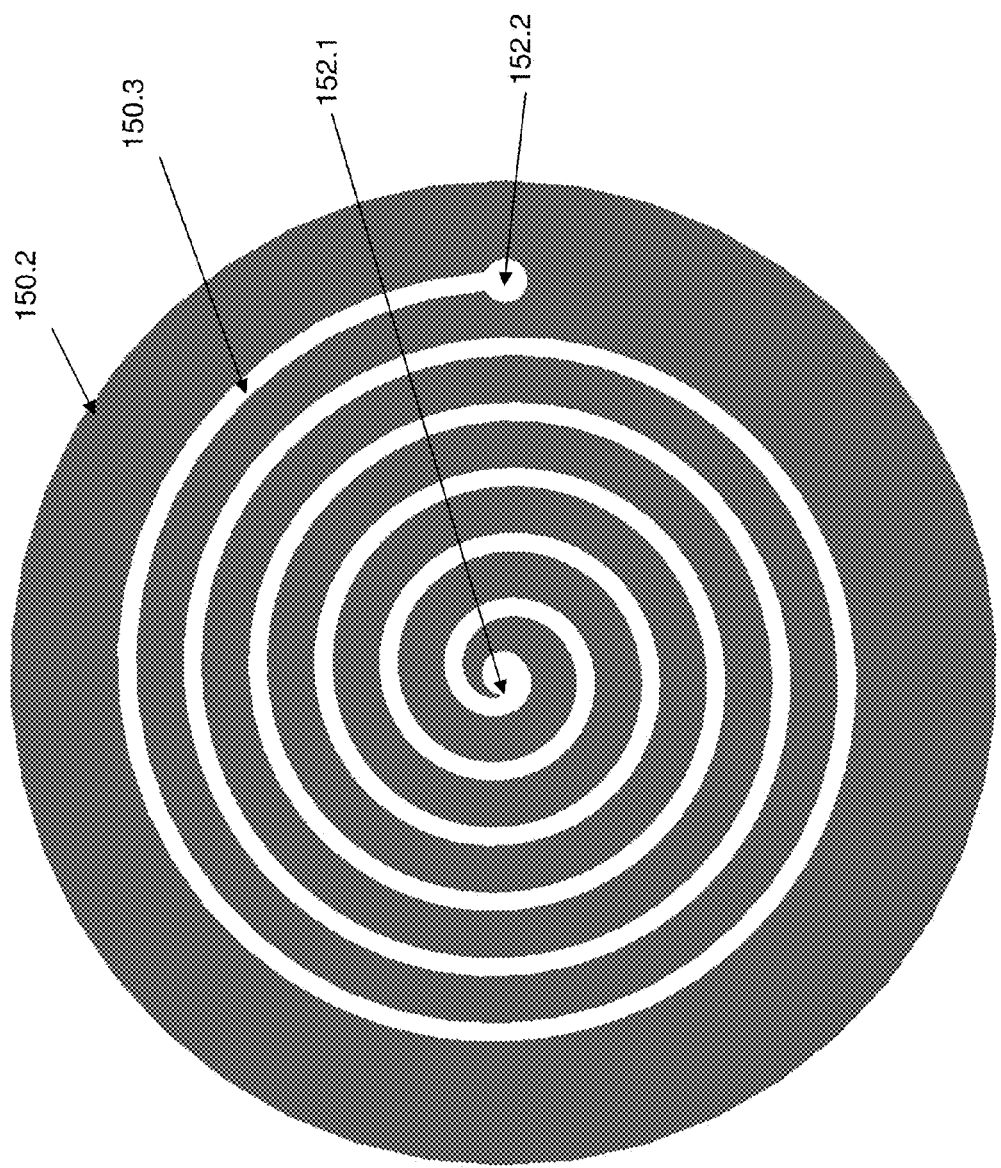
FIG. 10 is a plan view of a portion of another apparatus according to another embodiment of the present invention, and similar to the apparatus to FIG. 9.

FIG. 10 depicts a plate 150.2 for a hub 150 of a heat exchanging module 140 according to another embodiment of the present invention. Plate 150.2 defines on it a portion of a spiral microchannel flowpath 150.3. The spiral flowpath extends from an inlet 152.1 located near the center of hub 150 to an outlet 152.2 located near the periphery of the plate. With such a hub, the fluid connection 174 between adjacent modules 140 would include a tube that extends from the center of one module to the periphery of the adjacent module. Other features of module 140 are substantially the same as those described for module 40.

Figure 11:
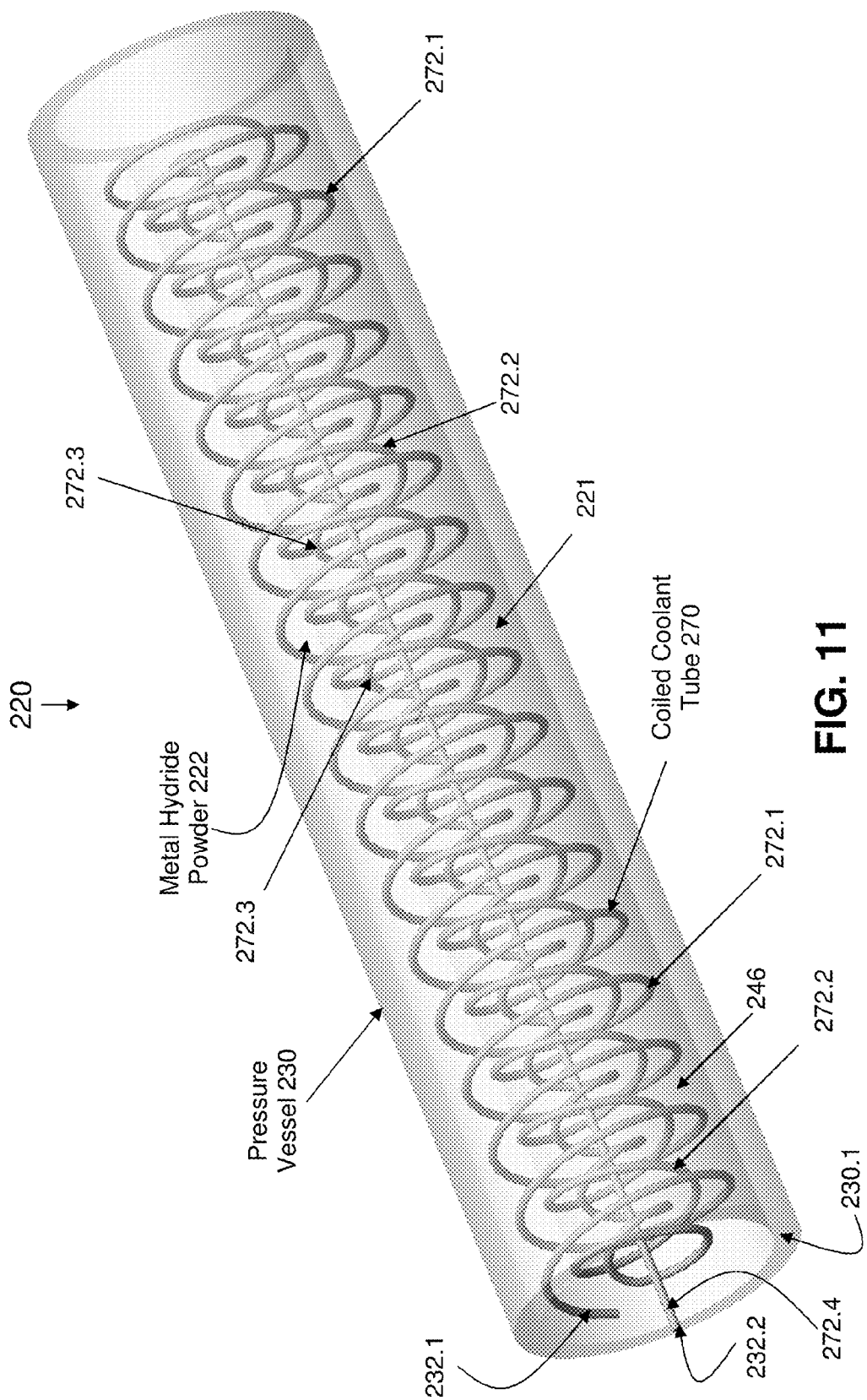
FIG. 11 is a 3-D perspective, partially transparent representation of a portion of a pressure vessel according to one embodiment of the present invention.
Figure 12:
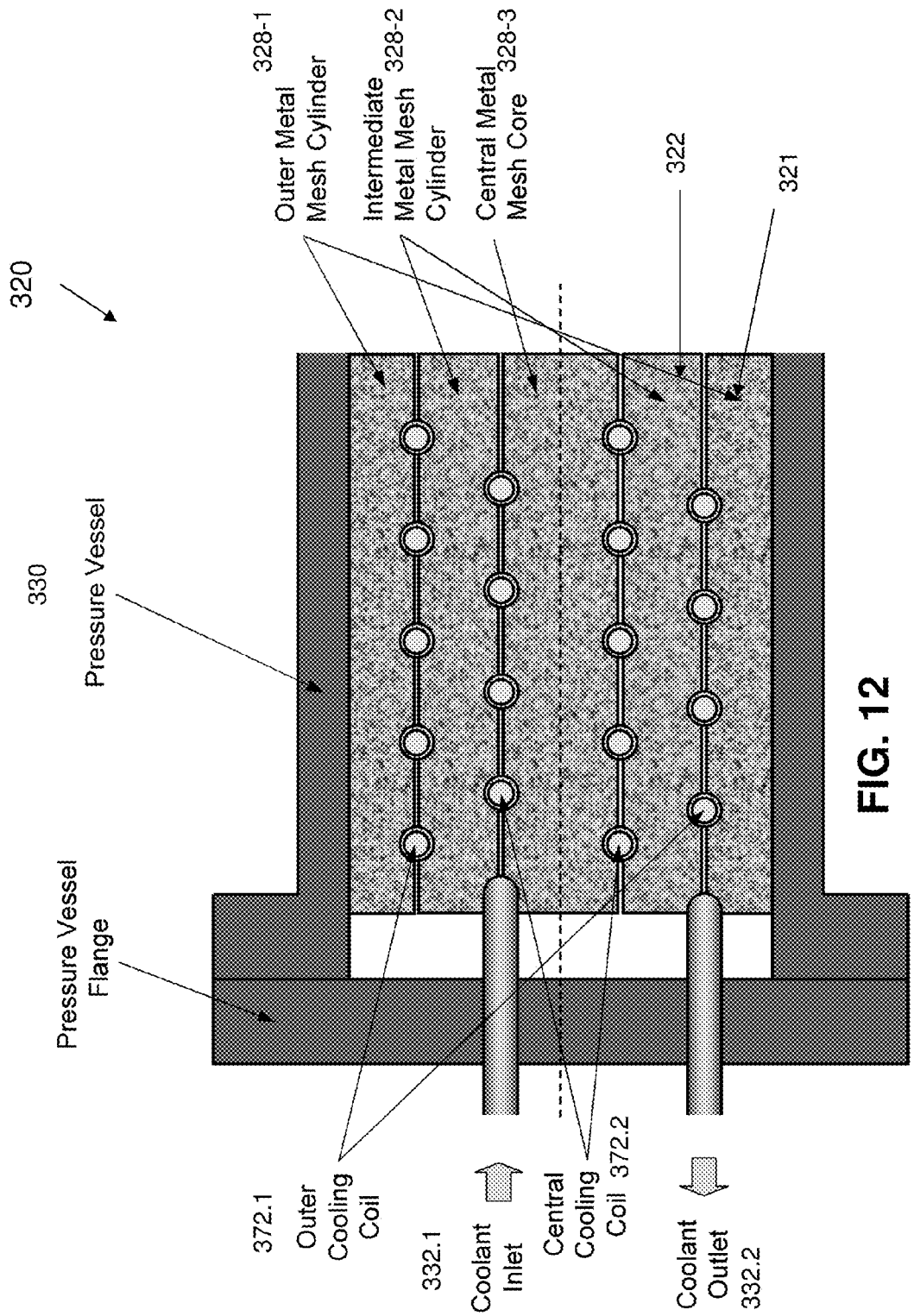
FIG. 12 is a cross-sectional representation of one end of a pressure vessel according to another embodiment of the present invention.

FIGS. 11 and 12 show other embodiments of the present invention. Various embodiments of the invention shown herein can include one or more aspects in their design. Some embodiments include use of concentric cooling coils that have a small distance from any metal hydride to the surface of cooling tube. As one example, in some embodiments, the maximum distance from any quantity of metal hydride to the surface of the cooling tube is less than about twenty millimeters, and preferably less than about fifteen millimeters. Yet other embodiments include the mixing high conductivity powder or metal mesh to enhance overall thermal conductivity of the metal hydride. Still other embodiments include the use of screw-shaped core and cylinders of metal mesh between the coils to enhance the thermal conductivity of the metal hydride. Some embodiments include stacking of short, screw-shaped core and cylinders of metal mesh instead of long ones in order to facilitate effective filling of the metal mesh with the metal hydride powder. In the latter embodiments, there are several segments of core or mesh extending along the length of the heat exchanger within or around any of the cooling coils. Yet other embodiments include the ability of heat exchanger to accommodate thermal expansion and contraction of the coils.

FIG. 11 illustrates the construction of the coiled tube heat exchanger for metal hydride hydrogen storage. This design consists of a cooling tube 270 that is formed into several concentric coils. The space between the coils is filled with metal hydride powder. Close proximity of coils helps shorten the distance of metal hydride power from the surface of the cooling tube, which enhances heat transfer effectiveness. The pitch of the coils may be varied to optimize the distance between the metal hydride and the tube as well as the length of the cooling tube. This heat exchanger construction is capable of accommodating thermal expansion and contraction of the coils.

The design of this heat exchanger may be modified by using more than one cooling tube. In addition, high thermal conductivity powder 228.1 or metal mesh 228.2 may be mixed in the metal hydride 222 to enhance the thermal conductivity of the metal hydride 222. Alternatively, screw-shaped central core and cylinders of metal mesh 328-1, 328-2, or 328-3 (or foam or honeycomb) may be squeezed between the coils to enhance the thermal conductivity of the metal hydride as illustrated in FIG. 12. The void in the metal mesh can be optimized for convenient filling of the metal mesh with the metal hydride. Shaping of the metal mesh to the surface of the cooling tube enhances thermal contact and heat transfer effectiveness between the metal hydride and the cooling tube. The long metal mesh core and cylinders may be replaced with shorter segmented ones that are stacked in parallel to facilitate effective filling of the metal hydride in the metal mesh. Also, instead of routing both the coolant inlet and outlet through the same end of the heat exchanger, they can be connected to the heat exchanger's opposite ends.

FIG. 11 shows a portion of a gaseous container assembly 220 according to one embodiment of the present invention. Assembly 220 includes a heat exchanging module 221 located within a generally cylindrical pressure vessel 230. For the sake of simplicity, the endcaps of the pressure vessel are not shown, nor are the coolant connections or the hydrogen port. These features are shown schematically in FIG. 1.

Heat exchanging module 221 preferably includes a coiled tube assembly 270 placed within a gas absorbing material 222 such as a metal hydride powder. Coiled coolant tube 270 extends from an inlet 232.1 in a continuous flowpath to an outlet 232.2. In one embodiment, tube assembly 270 includes an outermost coil 272.1 that extends from the proximate end of module 221 to the distal end. At the distal end, the tube is configured into an intermediate spiral 272.2 having a smaller outer diameter such that it can next within the outer spiral. Intermediate spiral 272.1 extends from the distal end of module 221 back toward the proximal end, where it transitions to a third, innermost spiral 272.3 that extends from the proximal end to the distal end of the hydride material 222. The innermost spiral 272.3 transitions at the distal end to a generally straight portion 272.4 that extends within the innermost spiral 272.3 back to the proximal end where it terminates in a fluid outlet 232.2.

Although a specific flowpath from an inlet connected to the outermost spiral to an outlet connected to a central tube has been shown and described, it is understood that the inlet and outlet connections can be reversed. Further, although a flowpath including multiple concentric spiral tubes has been shown and described, the present invention further contemplates numerous variations of the flowpath shown in FIG. 11, including as non-limiting examples, a single spiral with a straight return path, an outer spiral with an inner spiral return path, and others. Further, although the heat exchanger 220 shown in FIG. 11 shows the fluid inlet and outlet at the same end, it is appreciated that the fluid inlet and outlet can be at different ends of the heat exchanger In order to achieve an acceptable fill time, some embodiments of the present invention contemplate the placement of coils of the cooling tube such that there is no pocket 246 of hydride material that is more than about twenty millimeters from the surface of a cooling tube. Since the circumferential extent of the metal hydride powder increases as the radius of the cylinder increases, in some embodiments the pitch (coils per unit length) is greatest for the outermost spiral. Further, for nested, inner spirals, the pitch can be lesser (i.e., fewer coils per unit length). However, yet other embodiments contemplate substantially similar pitches among the different spirals. In the coiled tube 270 shown in FIG. 6, the pitch of each of the spiraled portion is about the same.

FIG. 12 is a partial cutaway of a gaseous container assembly 320 according to another embodiment of the present invention. Heat exchanging module 321 includes an outer cooling coil 372.1 arranged in a spiral that forms a substantially continuous flowpath with a central cooling coil 372.2 further arranged in a spiral. This embodiment includes the use of metal mesh to further improve the thermal conductivity within the gas absorbing material 322. Heat exchanging module 321 includes a generally cylindrical central mesh core 328.3 placed within the innermost spiral of central cooling coil 372.2. A second cylindrical sleeve 328.2 of metal mesh is placed between outer coil 372.1 and inner coil 372.2. A third generally cylindrical metal mesh sleeve 328.1 is placed between the inner diameter of the pressure vessel 330 and the outer cooling coil 372.1. These metal meshes or lattice-works 328.1, 328.2, and 328.3 are generally surrounded with the metal hydride powder 322 and increase the conductivity of heat from the material 322 to the cooling coils 372.1 and 372.2.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for exchanging heat between a medium and a substance, comprising:
    a pressure vessel having a first port for receiving a heat exchanging medium and a second port for returning the medium and a flowpath therebetween, said pressure vessel defining an interior;
    a plurality of heat exchanging modules within the interior, each said module being in fluid communication with another said module and with the flowpath, each said module including:
    a first plate having two sides and a plurality of fins extending from a first side, and a second plate having two sides and a plurality of fins extending from a first side, the second side of said first plate and the second side of said second plate being in contact and defining a passage therebetween, the passage having an inlet in fluid communication with the first port and an outlet in fluid communication with the second port.

2. The apparatus of claim 1 wherein said first plate is round and the fins of said first plate are concentric rings.

3. The apparatus of claim 1 wherein said second plate is round and the fins of said second plate are concentric rings.

4. The apparatus of claim 1 wherein one of the inlet or the outlet is centrally located in one of said first plate or said second plate.

5. The apparatus of claim 1 wherein the fins of said first plate are in contact with the substance and the fins of said second plate are in contact with the substance.

6. The apparatus of claim 1 which further comprises a plurality of fluid connectors, each said fluid connector receiving the medium from one module and providing the medium to another module.

7. The apparatus of claim 1 which further comprises a containment vessel placed within the interior for minimizing the movement of the substance within the pressure vessel, wherein said heat exchanging modules are located within said containment vessel.

8. The apparatus of claim 1 wherein the substance is a metal hydride.

9. An apparatus for exchanging heat between a medium and a substance, comprising:
 a heat exchanging hub having a periphery and being adapted and configured for being surrounded by the substance, said hub including:
 a first round plate having two sides and a plurality of fins extending from a first side, and a second round plate having two sides and a plurality of fins extending from a first side, the second side of said first plate and the second side of said second plate being joined in sealing contact and defining a passage therebetween having two ends,
 said first plate defining a first fluid port located proximate the periphery and in fluid communication with one end of the passage, said second plate defining a second fluid port located proximate the periphery and in fluid communication with the other end of the passage;
 wherein the first fluid port is generally opposite of said second fluid port after said first plate is joined to said second plate.

10. The apparatus of claim 9 wherein the passage has a serpentine shape.

11. The apparatus of claim 9 wherein the passage has a coil shape.

12. The apparatus of claim 9 wherein the passage is a microchannel having a hydraulic diameter less than about one millimeter.

13. An apparatus for exchanging heat between a medium and a substance, comprising:
 a cylindrical pressure vessel having two ends and a first port for receiving a heat exchanging medium and a second port for returning the medium, said pressure vessel defining an interior;
 at least one tube defining a continuous flowpath from the first port to the second port within the interior, the flowpath including an outer spiral extending from one end to the other end and an inner spiral extending from the other end to the one end and located within the outer spiral, the inner spiral being in fluid communication with one of the first port or the second port and the outer spiral being in fluid communication with the other of the first port or the second port; and
 a substantially porous metal mesh placed between the inner spiral and the outer spiral;
 wherein the substance substantially surrounds the inner spiral and substantially surrounds the outer spiral.

14. The apparatus of claim 13 wherein the pitch of the outer spiral is the same as the pitch of the inner spiral.

15. The apparatus of claim 13 wherein the pitch of the outer spiral is greater than the pitch of the inner spiral.

16. The apparatus of claim 13 wherein the first port and the second port are each proximate to the same end of said pressure vessel.

17. The apparatus of claim 13 wherein the inner spiral receives the medium from the first port and the outer spiral provides the medium to the second port.

18. The apparatus of claim 13 which further comprises a containment vessel placed within the interior for minimizing the movement of the substance within the pressure vessel, wherein said tube is located within said containment vessel.

19. The apparatus of claim 13 wherein the substance and the adsorbed gas are a metal hydride.

20. An apparatus for exchanging heat between a medium and a substance, comprising:
 a cylindrical pressure vessel having two ends and a first port for receiving a heat exchanging medium and a second port for returning the medium after the exchange of heat, said pressure vessel defining an interior;
 at least one tube defining a continuous flowpath from the first port to the second port within the interior, the flowpath including an outer spiral extending from one end to the other end and a substantially straight portion extending from the other end to the one end and located within the outer spiral, the straight portion being in fluid communication with one of the first port or the second port and the outer spiral being in fluid communication with the other of the first port or the second port;
 wherein the substance substantially surrounds the straight portion and substantially surrounds the outer spiral; and
 wherein said tube includes a first intermediate spiral located within the outer spiral, and a second intermediate spiral located within the first intermediate spiral and around the straight portion, said tube defining a four-pass flowpath through the substance.

21. The apparatus of claim 20 wherein said pressure vessel has an inner diameter of less than about 5 inches.

22. The apparatus of claim 20 wherein the outer diameter of said tube is less than about one half inch.

23. The apparatus of claim 20 wherein the straight portion receives the medium from the first port and the outer spiral provides the medium to the second port.

24. An apparatus for exchanging heat between a medium and a substance, comprising:
 a cylindrical pressure vessel having two ends and a first port for receiving a heat exchanging medium and a second port for returning the medium, said pressure vessel defining an interior;
 at least one tube defining a continuous flowpath from the first port to the second port within the interior, the flowpath including an outer spiral extending from one end to the other end and an inner spiral extending from the other end to the one end and located within the outer spiral, the inner spiral being in fluid communication with one of the first port or the second port; and the outer spiral being in fluid communication with the other of the first port or the second port;
 and
 a containment vessel placed within the interior for minimizing the movement of the substance within the pressure vessel, wherein said tube is located within said containment vessel;
 wherein the substance substantially surrounds the inner spiral and substantially surrounds the outer spiral.

25. The apparatus of claim 24 wherein the pitch of the outer spiral is the same as the pitch of the inner spiral.

26. The apparatus of claim 24 wherein the pitch of the outer spiral is greater than the pitch of the inner spiral.

27. The apparatus of claim 24 which further comprises a substantially porous metal mesh placed between the inner spiral and the outer spiral.

28. The apparatus of claim 24 wherein the first port and the second port are each proximate to the same end of said pressure vessel.

29. The apparatus of claim 24 wherein the inner spiral receives the medium from the first port and the outer spiral provides the medium to the second port.

30. The apparatus of claim 24 wherein the substance and the adsorbed gas are a metal hydride.

\* \* \* \* \*